(12) United States Patent
Fernandes et al.

(10) Patent No.: US 7,155,961 B2
(45) Date of Patent: Jan. 2, 2007

(54) BLEED LEAK DETECTION SYSTEM

(75) Inventors: Leslie Fernandes, La Canada, CA (US); Arnaud Amy, Creteil (FR)

(73) Assignee: Senior Operations, Inc., Bartlett, IL (US)

( * ) Notice: Subject to any disclaimer, the term of this patent is extended or adjusted under 35 U.S.C. 154(b) by 104 days.

(21) Appl. No.: 10/709,913

(22) Filed: Jun. 4, 2004

(65) Prior Publication Data
US 2006/0137431 A1 Jun. 29, 2006

(51) Int. Cl.
*G01M 3/00* (2006.01)

(52) U.S. Cl. .................. 73/49.1; 73/49.5; 73/40.5 R; 374/4

(58) Field of Classification Search .............. 73/49.1, 73/49.5, 40.5; 374/4
See application file for complete search history.

(56) References Cited

U.S. PATENT DOCUMENTS

| | | | | |
|---|---|---|---|---|
| 2,571,236 A | * | 10/1951 | Hamilton, Jr. ................. | 73/46 |
| 2,817,230 A | * | 12/1957 | McCully ....................... | 73/46 |
| 3,299,417 A | * | 1/1967 | Sibthorpe .................... | 340/605 |
| 3,371,521 A | * | 3/1968 | Hauk ............................ | 73/46 |
| 3,871,209 A | * | 3/1975 | Hasha ........................ | 73/49.1 |
| 4,534,662 A | | 8/1985 | Barlian | |
| 4,671,675 A | * | 6/1987 | Arisi et al. .................. | 374/147 |
| 4,750,189 A | | 6/1988 | Lancaster et al. | |
| 4,926,680 A | * | 5/1990 | Hasha et al. .................. | 73/46 |
| 5,067,094 A | * | 11/1991 | Hayes ......................... | 702/51 |
| 5,176,025 A | * | 1/1993 | Butts ........................ | 73/40.5 R |
| 5,330,720 A | | 7/1994 | Sorbo et al. | |
| 6,354,140 B1 | * | 3/2002 | Farkas et al. ............ | 73/40.5 R |
| 6,498,991 B1 | * | 12/2002 | Phelan et al. ................ | 702/34 |
| 6,799,452 B1 | * | 10/2004 | Brunet et al. ................ | 73/49.8 |

FOREIGN PATENT DOCUMENTS

| | | |
|---|---|---|
| CH | 682416 | 5/1990 |
| DE | 32 46 227 A1 | 12/1982 |
| EP | 0 240 820 | 10/1987 |
| GB | 2 226 417 A | 6/1990 |
| WO | WO 01/44773 | 6/2001 |
| WO | WO 02/088656 | 11/2002 |

* cited by examiner

*Primary Examiner*—Michael Cygan
(74) *Attorney, Agent, or Firm*—Greenberg Traurig LLP

(57) ABSTRACT

A leak detector for an insulated duct carrying pressurized hot air comprises a cuff secured over a circumferential cut in the insulation of the duct, thereby creating a reservoir of hot air which has leaked from the duct, a manifold defining a conduit therein in communication with the hot air reservoir and a cap for securing heat sensitive wires to manifold at the end of the conduit such that the hot air from the hot air reservoir impinges directly on the heat sensitive wires.

30 Claims, 6 Drawing Sheets

EXPLODED VIEW

BLEED LEAK DETECTION SYSTEM

FIELD OF THE INVENTION

This invention is related to the field of aerospace, and, in particular, to modern aircraft which utilize the flow of hot compressed bleed air from the engines for various on-board functions.

BACKGROUND OF INVENTION

It is well known in the art to use high temperature bleed air from the engines for various on-board purposes in a modern aircraft. Typically, a stream of hot air bled from the engines is used to provide an anti-icing function on the leading edge of the wings and empennage of the aircraft and is also used by the air conditioning units to supply fresh air to the passenger cabin. The bleed air must therefore be transported from the engines to various other areas of the aircraft, and this is typically accomplished utilizing insulated metallic ducts ranging in diameter from 1.00" to 4.00" and ranging in length from 6" to 120". The air in the duct can reach pressures up to 450 psig and temperatures of 1200° F., but is typically at a pressure of 45 psig and 660° F. in temperature.

The ducts carrying the engine bleed air are insulated to prevent damage to the aircraft. An insulation blanket is wrapped around the exterior of the duct. This insulation blanket may be composed of a material of the type sold under the tradename Q-Felt® and manufactured by the Johns-Manville Corporation of Denver, Colo. The insulation blanket is capable of lowering the exterior temperature of the duct from 660° F. to about 400° F. or less. A fiberglass impregnated silicon-rubber, textured metal foil, or fiberglass impregnated polyimide resin insulation shell is then wrapped around the exterior of the duct to contain the insulation blanket.

The ducts of the type mentioned can develop leaks from the cracking of the inner metallic duct. If such cracks go undetected, catastrophic failure of the duct can result. Therefore, it is necessary to have sensors positioned along the length of the duct to detect any leakage from the duct.

Prior art leak detection sensing systems consisted of a vent disk, which is a disk having a hole therein, which allowed a stream of hot air to escape the silicon-rubber, texturized foil, or polyimide resin insulation shell. In the event that a duct developed a crack, hot bleed air will flow from the metallic duct wall through the insulation blanket and to the vent disk, then through the hole in the vent disk. The vent disk hole is designed to spread the flow of hot air in a cone-like spray pattern impinging on a pair of heat detection wires spaced approximately 1.0" apart and positioned approximately 1.00" to 1.75" from the outer circumference of the duct. The heat detection wires are of the type sold under the tradename Firewire® and manufactured by Kidde Graviner Limited of the United Kingdom. The heat sensing wires which change their electrical characteristics when exposed to a predetermined temperature. In the case of typical prior art systems used in aircraft, the detection circuit will trip when the wire is exposed to a temperature of approximately 255° F. It is required that both wires of the pair of wires in proximity to the duct be exposed to this temperature before an alarm will be raised to the pilot of the aircraft, to prevent false alarms.

It is desirable that the leak detectors be able to detect a leak in the metallic duct through a crack having the equivalent area of a 5 mm diameter hole. In practice, it has been found that the prior art leak detection systems fail to detect such leaks. The primary reason for the failure of the prior art design is that there is insufficient air flow through the vent disk hole. This results in the hot air stream having insufficient temperature to trip the heat detection wires. First, the temperature of the hot air through the leakage in the metal duct is significantly reduced as the hot air passes through the insulation blanket. Second, the insulation blanket impedes the passage of the hot air from the site of the leak to the vent disk hole, underneath the silicon-rubber, texturized foil, or polyimide resin insulation shell. Further, it has been found that, by the time the air has traversed the distance between the vent disk hole and the sensor wires, it has fallen to a temperature well below the 255° F. necessary to trip the leak detection wires.

Therefore, it is desirable to improve the design of the leak detection system such that a leak through a crack in the metallic duct having an equivalent area of a 5 mm diameter hole is successfully detected. It is also desirable that the new design be able to be economically retrofitted into existing aircraft. In particular, it is desirable that the same existing sensor wires be used and that it not be necessary to remove the existing insulation and to re-insulate the ducts to install the improved leak detection system.

SUMMARY OF INVENTION

To produce air flow with adequate velocity, the laws of fluid dynamics dictate the necessity for both air pressure and volume. If sufficient air pressure exists at low volume, air flow velocity cannot be sustained once the volume is quickly depleted. If sufficient air volume is present without pressure, there is practically no movement of air from a high to a low pressure environment.

When the metallic duct develops a crack, the hot air leaks from duct interior to the insulation blanket. The insulation blanket changes the characteristics of the hot air leakage 1) by absorbing the thermal energy and reducing the air temperature; 2) by reducing the effective pressure due to pressure drop; and 3) by reducing the volume by diffusing the air in the annulus between metal duct and insulation shell throughout the length of the duct.

In a first embodiment of the invention, this problem is solved by recapturing or recollecting the degraded air into an air reservoir after the air has passed through the insulation blanket. This is accomplished by circumferentially cutting the insulation shell 360° at one or more locations along the length of the duct. The circumferential cuts will be covered by installing a "U"shaped cuff made from multi-ply silicone-rubber impregnated fiberglass cloth centered over each of the circumferential cuts and sealed at both ends to the insulation shell. The cuff re-collects the leakage of degraded hot air and acts as an air reservoir. A vent hole of the proper size and shape, similar to the hole in the vent disc, is provided for the air to be directed to the existing sensor wires. The vent hole will be supported by a silicone rubber pad on the inside of the cuff to stabilize the flow direction of the air through the vent hole. The pressure inside the cuff will begin to rise once the cuff is filled with air. The pressure will reach a steady state value when the flow from the crack in the duct and the flow through the vent hole reach a steady state condition.

With the first embodiment of the invention, it has been found, depending upon the distance between the vent hole in the cuff and the sensor wires, that, although there is a steady stream of air being expelled from the vent hole at a temperature sufficient to trip the detector, the air may still have insufficient heat once reaching the sensor wires as the result of its movement between the vent hole and the sensor wires due to a nozzle ejector effect mixing with ambient air around the duct.

Therefore, in a second, and preferred embodiment of the invention, a manifold has been added between the cuff and the sensor wires to direct the stream of hot air directly from the vent hole to the sensor wires without the loss of heat to the ambient environment. The design of the preferred embodiment consists of adding a manifold block and a manifold cap installed on top of the cuff and inline with the vent hole in the cuff. The manifold block is designed to route the hot air from a single conduit in the manifold, to a "Y" where the conduit divides into two conduits, which lead directly to the sensor sires. Hot air impingement is accomplished by installing a cap on the manifold block that secures each of the sensor wires in a channel groove. The channel groove in the cap for each sensor wire is designed to align with the outlet of the one of the two conduits running through the manifold from the "Y". As such, the hot air flows directly from the vent hole to the sensor wires with sufficient heat to trip the sensor wires.

DETAILED DESCRIPTION

Figure 6:
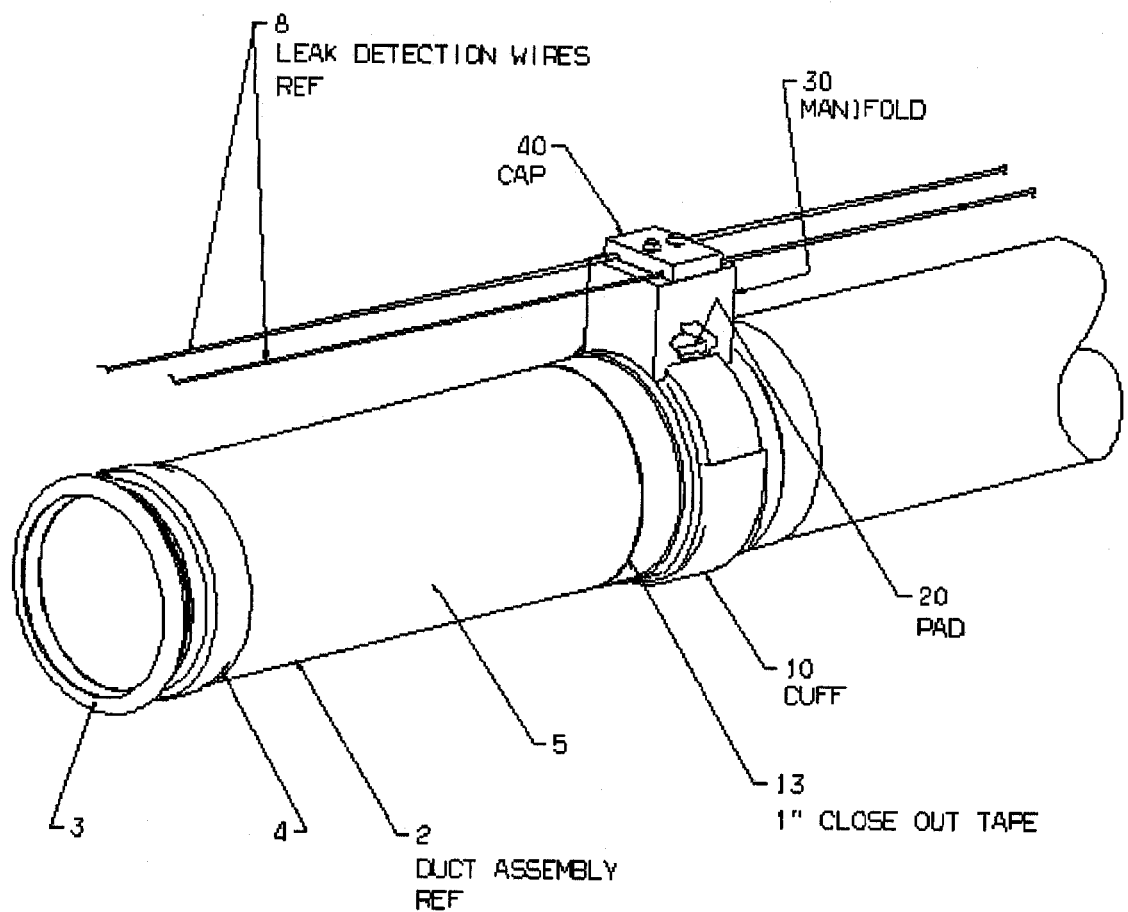
FIG. 6 shows the preferred embodiment of the invention installed on a duct.

A typical duct assembly 2 of the type with which the invention is intended to be used is shown in FIG. 6 and consists of an inner metal duct 3, typically composed of steel and 1.00" to 4.00" in diameter, covered by insulation blanket 4, and secured by outer insulation shell 5. Insulation blanket 4 and outer insulation shell 5 are composed of materials as previously discussed.

Figure 1:
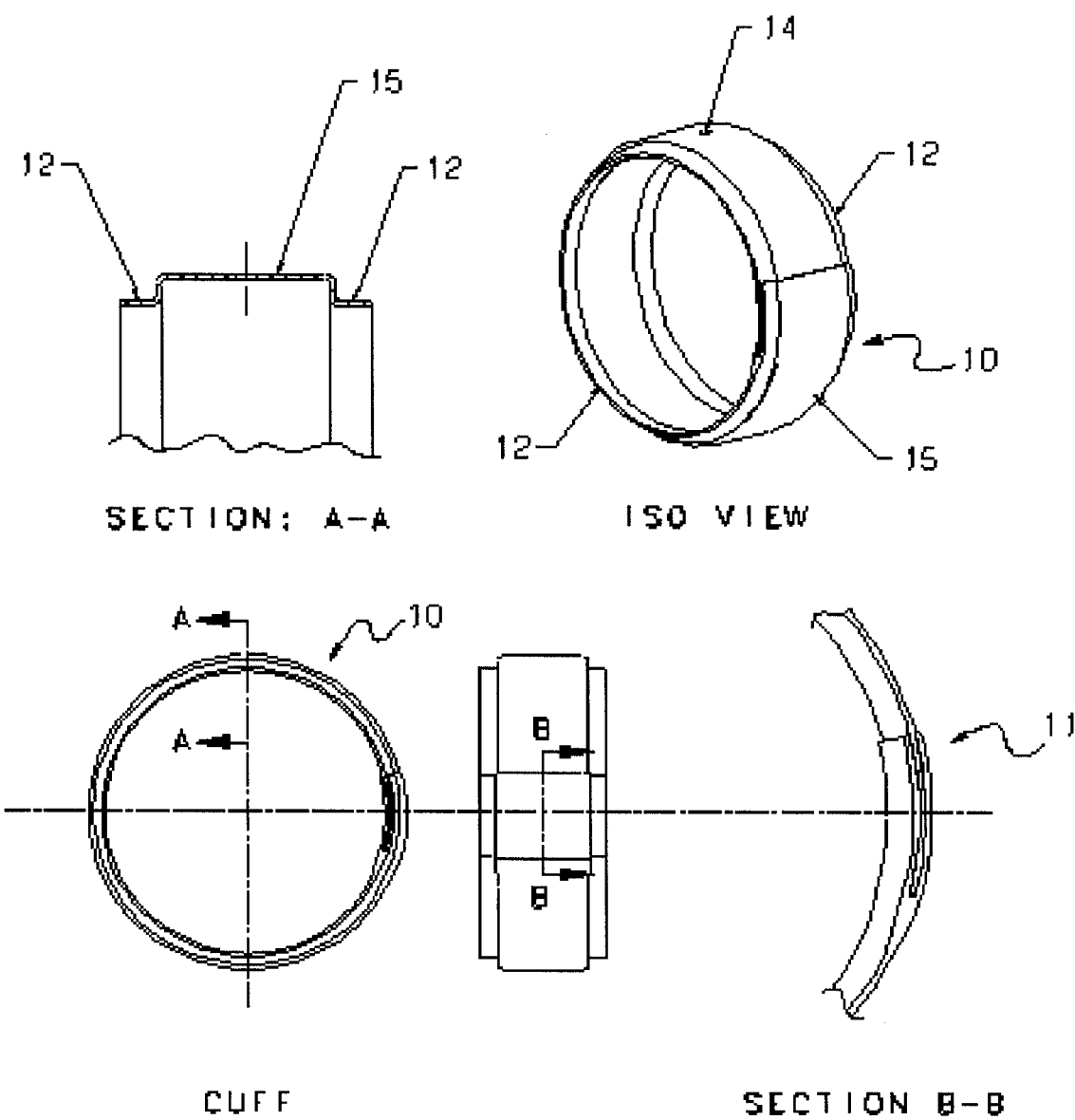
FIG. 1 shows side, cross sectional and isometric views of the cuff.
Figure 2:
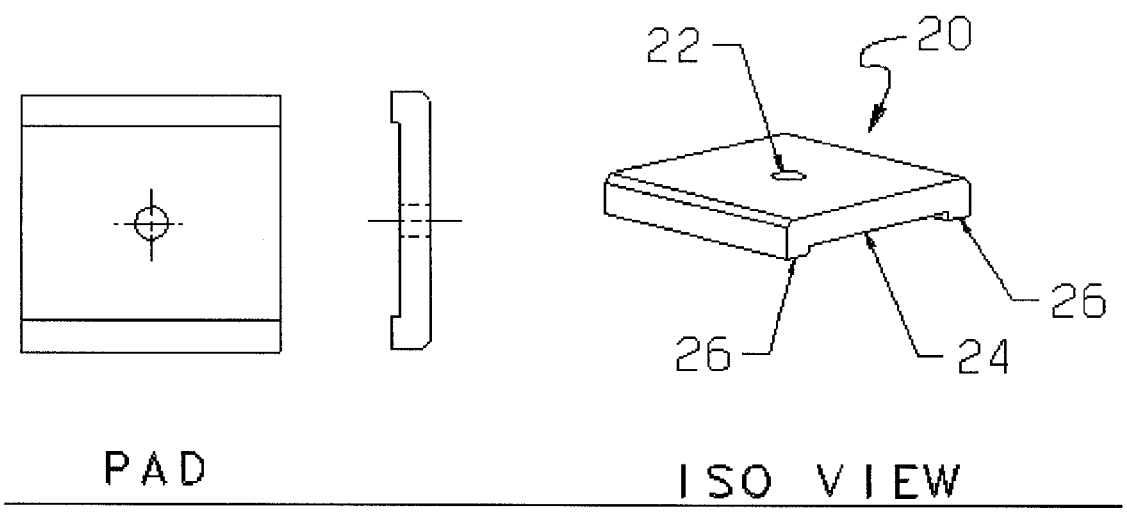
FIG. 2 shows top, side and isometric views of the pad.

FIG. 1 shows the cuff 10 portion of the invention. Cuff 10 is positioned circumferentially around outer insulation shell 5 of duct assembly 2 as shown in FIG. 6. Preferably, cuff 10 is composed of multiple plies of fiberglass impregnated with silicon rubber, and, in the most preferred embodiment, three plies are used to avoid having cuff 10 rupture due to excessive pressure build-up when installed in situ around duct assembly 2. Before securing cuff 10 to duct assembly 2, at least outer insulation shell 5 is cut circumferentially around duct assembly 2. A small amount of outer insulation shell 5 may also be removed to form a narrow gap in outer insulation shell 5.

To secure cuff 10 to duct assembly 2, cuff 10 is situated circumferentially around the portion of duct assembly 2 in which the cut in outer insulation shell 5 has been made, and the tongue and groove arrangement 11, as shown in FIG. 1, at the ends of cuff 10 are engaged.

FIG. 1, section A—A, shows a cross sectional view of cuff 10 showing a raised middle portion 15 with shoulders 12 on either side thereof. Shoulders 12 will rest against outer insulation shell 5 of duct assembly 2, while raised middle portion 15 remains above insulation shell 5, thereby defining an annular-shaped void thereunder. Cuff 10 is secured to duct 2 by wrapping shoulders 12 and the adjoining area of outer insulation shell 5 with a heat-resistant, silicon-rubber compound tape, 13, as shown in FIG. 6. One example of an appropriate heat-resistant, silicon-rubber tape 13 is sold under the tradename MOX-Tape™ and manufactured by Arlon Corporation of Santa Ana, Calif. In lieu of heat resistant tape 13, any known method of securing cuff 10 to duct assembly 2 may be used, as long as the passage of air through insulation layer 4 to the void under cuff 10 is not restricted. Cuff 10 should be situated on duct assembly 2 such that hole 14 is in a convenient orientation with respect to the position of existing sensor wires 8 such that air escaping hole 14 will impinge on both of the sensor wires 8. Because pressures within the inner metal portion 3 of duct assembly 2 can reach up to 45 psig, it can be expected that pressure within the void created between cuff 10 and duct assembly 2 may also experience similar pressures. As a result, it is possible that middle portion 15 of cuff 10 may deform because of bowing due to pressure buildup in the void inside cuff 10. As a result, it is possible that hole 14 may not direct the air escaping therefrom to impinge onto sensor wires 8 when middle portion 15 of cuff 10 is deformed. Therefore, to assist in keeping hole 14 pointed toward sensor wires 8, pad 20 is situated on the inside of cuff 10 between cuff 10 and outer insulation shell 5 of duct assembly 2. Pad 20 is configured with two "legs" 26 which may rest on the outer surface of duct assembly 2 and channel 24 between legs 26 which has been provided to allow pressurized air within the void created by cuff 10 to reach the underside of hole 22. Pad 20 is adhered to the inner surface of cuff 10 using any means known in the prior art, such as with room temperature vulcanizing silicon rubber (RTV) adhesive sold by Dow-Corning. Pad 20 is composed of a flexible silicon rubber compound having a durometer of between 20 and 50 Shore hardness, such that pad 20 should align with hole 14 in cuff 10 such that air can flow from the void created by cuff 10 through channel 24, hole 22 and out of hole 14.

The configuration of cuff 10 and pad 20 comprise one embodiment of the invention which is functional as long as sensor wires 8 are in close enough proximity to the outer surface of cuff 10 such that the air being forced from hole 14 has enough heat by the time it impinges on sensor wires 8 such as to trip the detector. This temperature is approximately 255° F. In the event that sensor wires 8 are too far away from duct 2 to be tripped by the escaping air, then the second, and preferred, embodiment of the invention may be used.

Figure 3:
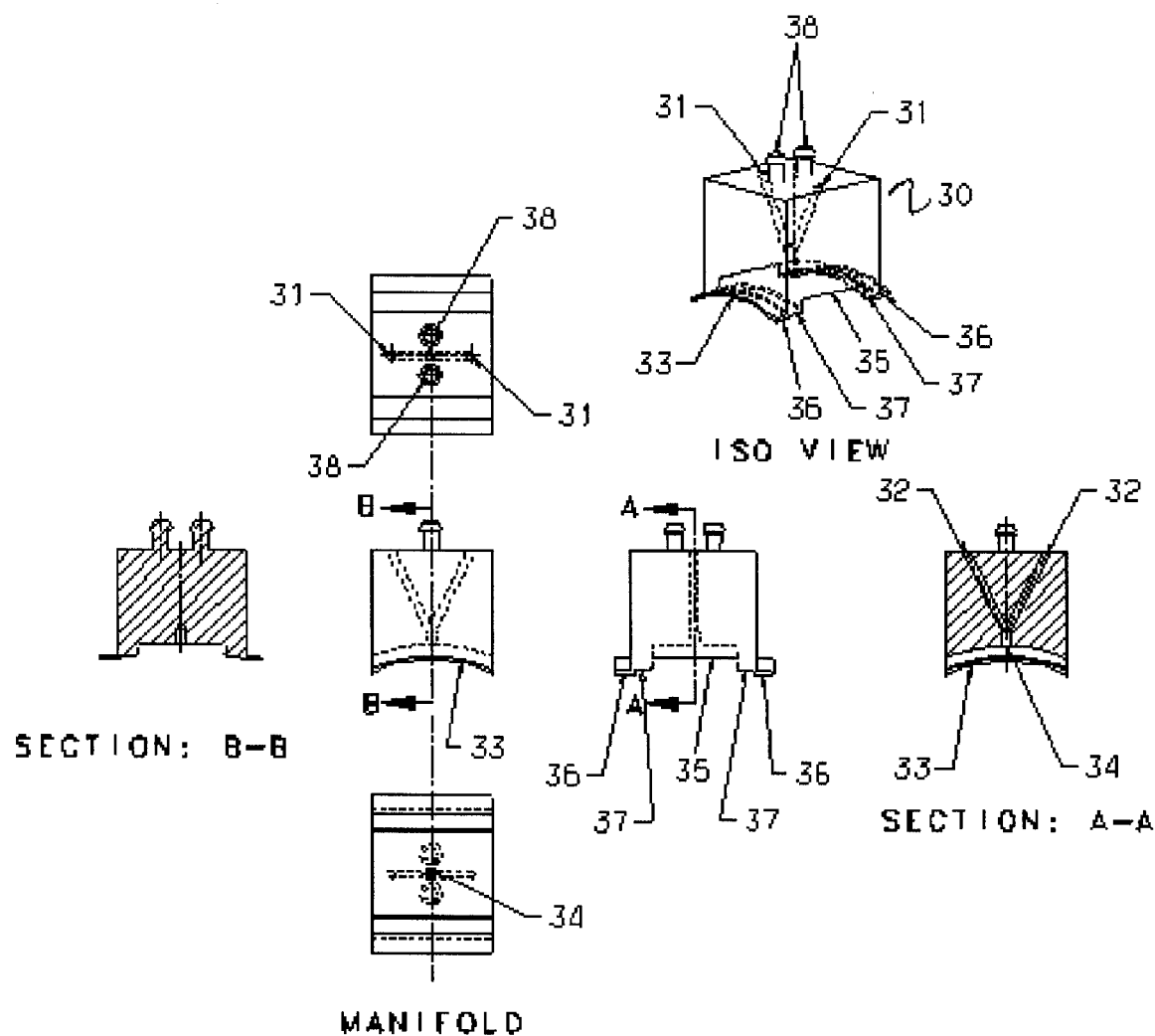
FIG. 3 shows top, bottom, side, cross sectional and isometric views of the manifold block.
Figure 4:
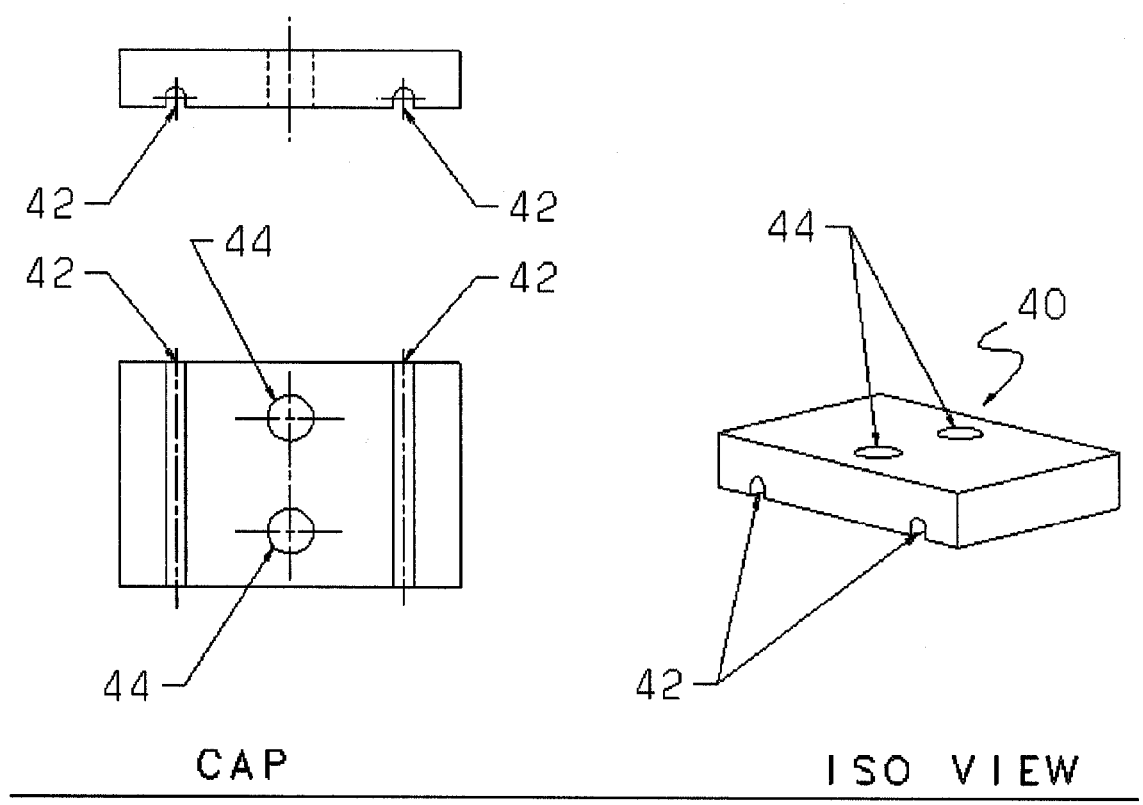
FIG. 4 shows top, side and isometric views of the cap.
Figure 5:
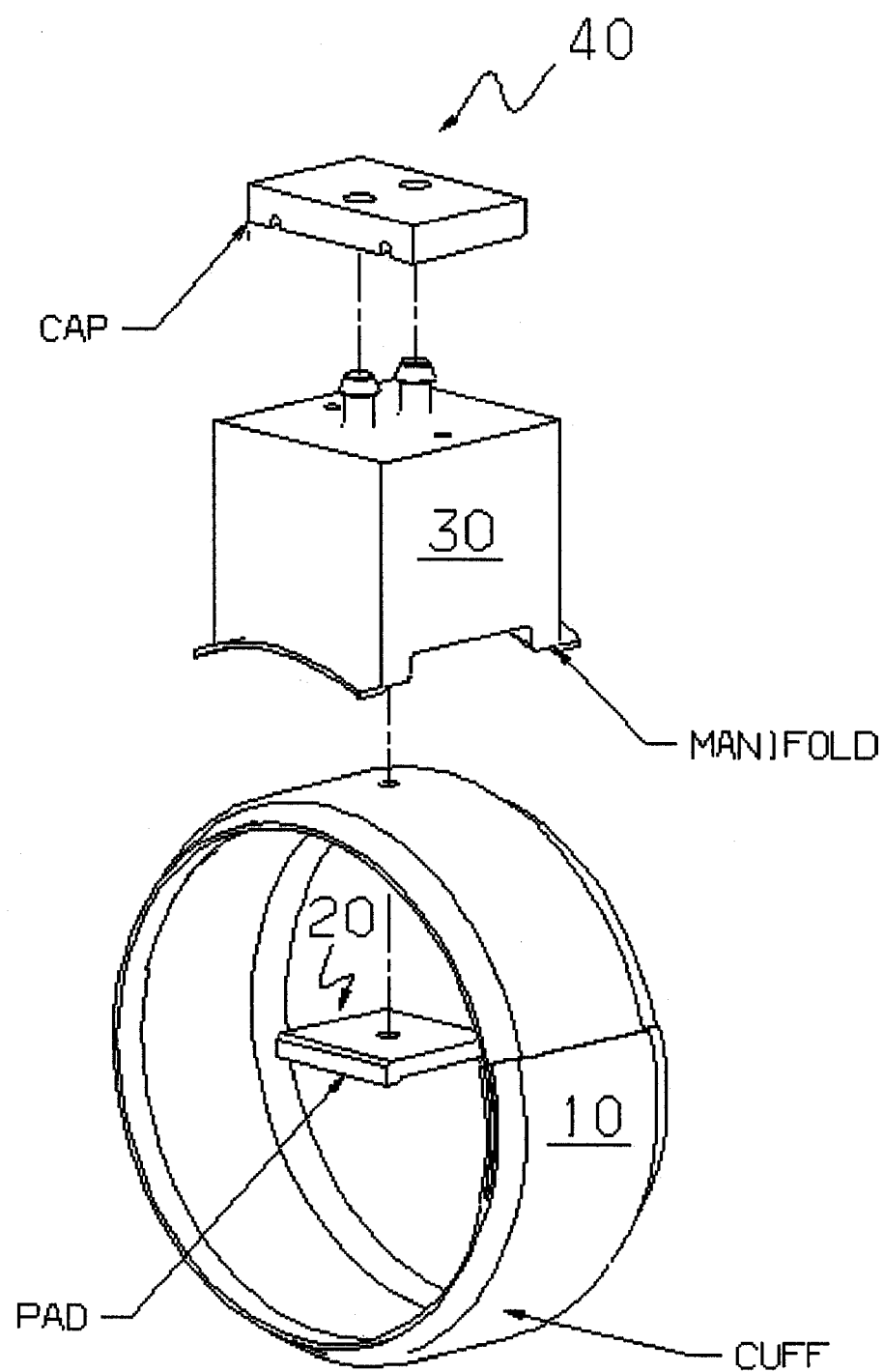
FIG. 5 shows an exploded view of the invention showing the cuff pad, manifold and cap and their placement with respect to each other.

The preferred embodiment of the invention includes cuff 10 and pad 20 already discussed in addition to manifold block 30 and cap 40. Manifold block 30 is shown in various views in FIG. 3 and in situ in FIG. 6. Manifold 30 is a block of silicon rubber compound having channels defined therein to route the air from hole 14 in cuff 10 directly to sensor wires 8, which will be captured by channels 42 in cap 40 at the top of manifold block 30.

Manifold block 30 is provided with a defined radius 33 on the bottom thereof which matches the outer radius of cuff 10 when in place on duct assembly 2. Naturally, radius 33 will vary depending upon the size of duct assembly 2 upon which cuff 10 is installed. The bottom of manifold block 30 is also configured to match the outer shape of cuff 10. Shoulders 37 on the bottom of manifold block 30 will sit in shoulders 12 on cuff 10 and channel 37 will accept the raised middle portion 15 of cuff 10. Wings 36, defined on the outer edges of manifold block 30 at the bottom thereof, extend past the outer edge of cuff 10 and are used to secure manifold block 30 to cuff 10 through the use of heat-resistant tape 13 of the same type used to secure cuff 10 to the outside of duct assembly 2.

Defined within manifold 30 is a conduit 34 which, when manifold block 30 is place over cuff 10, aligns with hole 14 in cuff 10. Conduit 34 splits into two separate conduits 32 which extend to the top of manifold block 30 and emerge through holes 31 defined thereon, thereby forming a "Y" shaped conduit in the interior of manifold block 30. Sensor wires 8 are captured in channels 42 of cap 40, which lock them into place directly above holes 31. Posts 38 defined on the top of manifold block 30 are used to hold cap 40 in place and to keep sensor wires 8 positively aligned with holes 31 in manifold 30, thereby allowing hot air coming from conduits 32 through holes 31 to impinge directly on sensor wires 8, without the loss of heat experienced in the prior art when the hot air was forced through an environment of much lower temperature.

Holes 44, defined in cap 40, mate with posts 38 disposed on the top of manifold block 30, to form a snap type fitting to secure cap 40 firmly in place on the top of manifold block 30 without the use of tools. Manifold block 30 is preferably composed of a silicon rubber compound having a durometer reading between 65 and 85. Alternatively, manifold block 30 may be made of other materials, such as aluminum, however, care must be taken to avoid excessive heat transfer through the metal body of manifold block 30 such as to lower the temperature of the hot air emerging from holes 31. Also, preferably, cap 40 will be softer than manifold block 30, having a durometer reading of between 30 and 50 Shore hardness, such that the cap can be removed from snap posts 38 without damaging the manifold block.

Tests of this design were conducted in a lab wherein an original prior art vent disk design and the design of the embodiments of the invention disclosed herein were installed adjacent to one another on a duct assembly. A partial cut measuring approximately 0.025" wide by 1.25" long was made in the metal portion 3 of duct assembly 2 to simulate a crack-like failure having an area equivalent to a 5 mm diameter hole, and the metal portion 3 of duct assembly 2 was pressurized. The air flow through the original vent disk was undetectable, while the air flow through vent 14 in cuff 10 was of significant velocity throughout a range of duct pressures ranging from 5 psi to 40 psi. The pressure in the void created by cuff 10 was measured and was found to be approximately 12% of the pressure in the metal portion 3 of duct assembly 2. The pressure combined with the volume in cuff 10 provided a visual and a measurable flow of air through vent hole 14 in cuff 10, thereby meeting the objective of the invention.

The embodiments disclosed herein are exemplary in nature and are not intended to restrict the scope of the invention. Alternate materials, methods of securing the various parts on the invention, and different configurations and shapes for the cuff, manifold block and cap are contemplated as being within the scope of the invention.

The invention claimed is:

1. In a metal duct for the transport of high temperature pressurized air, said duct having a layer of insulation wrapped therearound and an insulation shell over said layer of insulation, an improvement comprising:
   a cuff of flexible material for wrapping circumferentially around a portion of said duct, said cuff radially overlapping at least a portion of both said insulation and said insulation shell, wrapped around said duct, thereby creating a radially extending, circumferential void between a portion of said cuff, said insulation, and said insulation shell, collectively, and an inner surface of said cuff;
   said cuff having a hole defined therein, wherein said hole is in communication with said void.

2. The improvement of claim 1 further comprising:
   a pad, having a hole defined therein, positioned on the side of said cuff facing said insulation shell, said hole in said pad being aligned with said hole in said cuff, for purposes of reinforcing the area of said cuff in proximity to said hole in said cuff;
   wherein said pad is adhered to the inner surface of said cuff.

3. The improvement of claim 2 wherein said cuff is composed of fiberglass impregnated with a silicon-rubber compound.

4. The improvement of claim 3 wherein said cuff is composed of multiple plies of said fiberglass-impregnated with a silicon-rubber compound.

5. The improvement of claim 4 wherein said pad is composed of a silicon-rubber compound.

6. The improvement of claim 5 wherein said pad had a durometer reading of between 30 and 50.

7. The improvement of claim 2 wherein a portion of said pad rests against said insulation shell and further wherein the portion of said pad wherein said hole is defined does not rest against said insulation shell, thereby maintaining communication between said void and said hole in said cuff.

8. The improvement of claim 2 wherein the ends of said cuff join together in a tongue and groove joint when said cuff is wrapped around said duct.

9. The improvement of claim 2 wherein the cross section of said cuff comprises a raised middle portion having two shoulders on opposite sides thereof.

10. The improvement of claim 2 wherein said cuff is secured around said duct over a portion of said duct having a circumferential cut through said insulation shell.

11. In a metal duct for the transport of high temperature pressurized air, said duct having a layer of insulation wrapped therearound and an insulation shell over said layer of insulation, an improvement comprising:
   a cuff of flexible material for wrap/ping circumferentially around a portion of said duct, thereby creating a void between a portion of said cuff and said insulation shell;
   said cuff having a hole defined therein, wherein said hole is in communication with said void;
   a pad, having a hole defined therein, positioned on the side of said cuff facing said insulation shell, said hole in said pad being aligned with said hole in said cuff, for purposes of reinforcing the area of said cuff in proximity to said hole in said cuff;
   wherein said pad is adhered to the inner surface of said cuff;
   and further wherein the cross section of said cuff comprises a raised middle portion having two shoulders on opposite sides thereof;
   and still further
   wherein said cuff is secured to said duct with a heat-resistant tape wrapped around said duct and said shoulders of said cuff.

12. The improvement of claim 11 further comprising:
   a manifold block disposed on said cuff adjacent said hole defined in said cuff, said manifold block defining a "Y" shaped conduit therein; and
   a cap, disposed on the top of said manifold block and secured thereon, said cap defining two channels therein for capturing of a pair of temperature-sensitive wires.

13. The improvement of claim 12 wherein the leg of said "Y" shaped conduit exits the bottom of said manifold block and is in communication with said hole defined in said cuff and further wherein the arms of said "Y" shaped conduit exit the top of said manifold block opposite said cuff.

14. The improvement of claim 13 wherein said cap holds said pair of temperature-sensitive wires over said exit holes defined in the top of said manifold block.

15. The improvement of claim 13 wherein said manifold block and said cap are composed of a silicone-rubber compound.

16. The improvement of claim 13 wherein said manifold block and said cap are composed of a metal.

17. The improvement of claim 14 wherein said cap defines one or more holes therein for accepting one or more posts defined on the top of said manifold block for securing said cap thereto.

18. The improvement of claim 12 wherein said manifold block has a curved bottom having a radius matching the outer radius of said raised portion of said cuff.

19. The improvement of claim 12 where the bottom surface of said manifold is contoured to match the contour of the outer surface of said cuff.

20. The improvement of claim 19 wherein the contoured bottom of said manifold block has a raised portion for accepting the raised middle portion of said cuff and two shoulders which rest against the shoulders defined on said cuff.

21. The improvement of claim 20 wherein said manifold block further comprises two wings defined along the edges of said manifold block adjacent said shoulders.

22. The improvement of claim 21 wherein said manifold block is secured to said cuff by wrapping a heat-resistant tape around said duct, said cuff and said wings defined on said manifold block.

23. The improvement of claim 15 wherein said manifold block has a durometer reading of between 65 and 85 and wherein said cap has a durometer reading of between 30 and 50.

24. In a metal duct for the transport of high temperature pressurized air, said duct having a layer of insulation wrapped therearound and an insulation shell over said layer of insulation, an improvement comprising:
    a cuff of flexible material for wrapping circumferentially around a portion of said duct, thereby creating a void between a portion of said cuff and said insulation shell;
    said cuff having a hold defined therein, wherein said hold is in communication with said void;
    a pad, having a hole defined therein, positioned on the side of said cuff facing said insulation shell, said hold in said pad being aligned with said hole in said cuff, for purposes of reinforcing the area of said cuff in proximity to said hold in said cuff;
    a manifold block disposed on said cuff adjacent said hole defined in said cuff, said manifold block defining a "Y" shaped conduit therein; and
    a cap, disposed on the top of said manifold block and secured thereto, said cap defining two channels therein for capturing of a pair of temperature-sensitive wires.

25. A method of improving the temperature detection capabilities of a sensor comprised of a pair of heat-sensitive wires for detecting leaks of hot air from a duct, said duct being wrapped with a layer of insulation covered by a silicon-rubber insulation shell comprising the steps of:
    making a circumferential cut in said insulation shell;
    securing a cuff having a raised portion over said cut in said insulation shell, said raised portion of said cuff creating a void between said cuff and said insulation shell, said cuff defining a hole therein in communication with said void;
    securing a manifold block over said hole defined in said shell, said manifold block defining one or more conduits therein in communication with said hole defined in said cuff; and
    securing one or more heat sensitive wires at the ends of said one or more conduits opposite said cuff.

26. The method of claim 25 wherein said cuff and said manifold block are composed of a silicon-rubber compound.

27. The method of claim 25 wherein said step of securing one or more heat sensitive wires further comprises the step of:
    securing a cap to a surface of said manifold block wherein said one or more conduits exit said manifold block, said cap having one or more channels defined therein for accepting said one or more temperature sensitive wires, said cap holding said one or more temperature-sensitive wires in place over the ends of said one or more conduits.

28. The method of claim 25 wherein said cap is secured to said manifold block with a snap fitting.

29. The method of claim 25 wherein said cuff is secured to said duct using a heat-sensitive tape.

30. The method of claim 25 wherein said manifold is secured to said cuff using a heat sensitive tape.

\* \* \* \* \*